(12) United States Patent
Boeing et al.

(10) Patent No.: US 8,877,667 B2
(45) Date of Patent: Nov. 4, 2014

(54) PROCESS FOR REGENERATING A CATALYST

(75) Inventors: Christian Boeing, Cologne (DE); Dirk Roettger, Cologne (DE); Reiner Bukohl, Marl (DE); Markus Winterberg, Datteln (DE); Dietrich Maschmeyer, Recklinghausen (DE)

(73) Assignee: Evonik Degussa GmbH, Essen (DE)

( * ) Notice: Subject to any disclaimer, the term of this patent is extended or adjusted under 35 U.S.C. 154(b) by 282 days.

(21) Appl. No.: 13/381,676

(22) PCT Filed: Jun. 16, 2010

(86) PCT No.: PCT/EP2010/058423
§ 371 (c)(1),
(2), (4) Date: Feb. 28, 2012

(87) PCT Pub. No.: WO2011/000695
PCT Pub. Date: Jan. 6, 2011

(65) Prior Publication Data
US 2012/0149549 A1    Jun. 14, 2012

(30) Foreign Application Priority Data
Jul. 1, 2009 (DE) .......................... 10 2009 027 405

(51) Int. Cl.
| | |
|---|---|
| *B01J 38/04* | (2006.01) |
| *B01J 38/06* | (2006.01) |
| *B01J 38/02* | (2006.01) |
| *B01J 23/92* | (2006.01) |
| *B01J 23/02* | (2006.01) |
| *B01J 21/12* | (2006.01) |

(52) U.S. Cl.
CPC *B01J 38/06* (2013.01); *B01J 23/92* (2013.01); *B01J 23/02* (2013.01); *B01J 21/12* (2013.01)
USPC .................................. 502/55; 502/34; 502/56

(58) Field of Classification Search
USPC .................................................. 502/20–56
See application file for complete search history.

(56) References Cited

U.S. PATENT DOCUMENTS

| | | |
|---|---|---|
| 2,377,026 A | 5/1945 | Miller |
| 4,521,638 A * | 6/1985 | Kida et al. .................... 585/640 |
| 4,536,605 A | 8/1985 | Kida et al. |
| 5,043,518 A | 8/1991 | Michaelson et al. |
| 6,657,090 B2 | 12/2003 | Rix et al. |
| 7,005,455 B2 * | 2/2006 | Cnossen et al. ............... 518/700 |
| 7,473,812 B2 | 1/2009 | Peters et al. |
| 7,737,318 B2 | 6/2010 | Santiago-Fernandez et al. |
| 7,910,786 B2 | 3/2011 | Winterberg et al. |
| 7,919,662 B2 | 4/2011 | Winterberg et al. |
| 7,932,428 B2 | 4/2011 | Rix et al. |
| 7,968,758 B2 | 6/2011 | Winterberg et al. |
| 7,977,523 B2 * | 7/2011 | Zanthoff et al. ............... 585/649 |
| 2005/0277542 A1 | 12/2005 | Kaminsky et al. |
| 2007/0129235 A1 | 6/2007 | Brown et al. |
| 2007/0203369 A1 | 8/2007 | Praefke et al. |
| 2008/0058572 A1 | 3/2008 | Fernandez et al. |
| 2010/0081562 A1 | 4/2010 | Lansink Rotgerink |
| 2010/0144998 A1 | 6/2010 | Santiago-Fernandez et al. |
| 2011/0118523 A1 | 5/2011 | Winterberg et al. |

FOREIGN PATENT DOCUMENTS

| | | |
|---|---|---|
| CN | 1853772 | 11/2006 |
| EP | 0 071 137 | 2/1983 |
| EP | 0 589 557 | 3/1994 |
| JP | S5830340 (A) | 2/1983 |
| JP | 2008502476 (A) | 1/2008 |

OTHER PUBLICATIONS

U.S. Appl. No. 13/880,862, filed Apr. 22, 2013, Winterberg, et al.
International Search Report Issued Dec. 14, 2010 in PCT/EP10/058423 Filed Jun. 16, 2010.
U.S. Appl. No. 13/381,680, filed Dec. 30, 2011, Winterberg, et al.
U.S. Appl. No. 14/005,479, filed Sep. 16, 2013, Winterberg, et al.
Office Action issued Mar. 3, 2014, in Japanese Application No. 2012-518861 (with English-language Translation).

* cited by examiner

*Primary Examiner* — Jennifer A Smith
(74) *Attorney, Agent, or Firm* — Oblon, Spivak, McClelland, Maier & Neustadt, L.L.P.

(57) ABSTRACT

The invention relates to a process for regenerating catalysts containing mixed oxides from the group of alkali metal and/or alkaline earth metal oxides, aluminium oxide and silicon oxide, characterized in that the regeneration comprises the following features:
   i) treatment of the catalyst in situ,
   ii) contacting of the catalyst with water,
   iii) treatment of the catalyst within a temperature range from 100 to 400° C.,
   iv) treatment of the catalyst within a pressure range from 0.1 to 2 MPa,
   v) treatment of the catalyst over a period of 0.1 to 24 h,
   vi) treatment of the catalyst with a specific catalyst hourly space velocity of 0.1 to 100 $h^{-1}$.

20 Claims, No Drawings

PROCESS FOR REGENERATING A CATALYST

The present invention relates to a process for in situ regeneration of a catalyst which is used to prepare isoolefins from tent-alkyl ethers.

Isoolefins, for example isobutene, are important intermediates for the preparation of a multitude of organic compounds. Isobutene is, for example, a starting material for the preparation of butyl rubber, polyisobutylene, isobutene oligomers, branched $C_5$ aldehydes, $C_5$ carboxylic acids, $C_5$ alcohols and $C_5$ olefins. It is also used as an alkylating agent, especially for the synthesis of tert-butylaromatics, and as an intermediate for obtaining peroxides. In addition, isobutene can be used as a precursor for methacrylic acid and its esters.

In industrial streams, isoolefins are usually present together with other olefins and saturated hydrocarbons with the same number of carbon atoms. The isoolefins cannot be removed in an economically viable manner from these mixtures with physical separating methods alone.

For example, isobutene is present in typical industrial streams together with saturated and unsaturated $C_4$ hydrocarbons. Owing to the small boiling point difference and the small separating factor between isobutene and 1-butene, isobutene cannot be removed from these mixtures in an economically viable manner by distillation. Isobutene is therefore frequently obtained from industrial hydrocarbons by converting isobutene to a derivative which can be removed easily from the remaining hydrocarbon mixture, and by dissociating the isolated derivative back to isobutene and derivatizing agent.

Typically, isobutene is removed from $C_4$ cuts, for example the $C_4$ fraction of a steamcracker, as follows: after removal of the majority of the polyunsaturated hydrocarbons, mainly the 1,3-butadiene, by extraction/extractive distillation or selective hydrogenation to give linear butenes, the remaining mixture (raffinate I or selectively hydrogenated crack-$C_4$) is reacted with alcohol or water. Isobutene forms methyl tert-butyl ether (MTBE) when methanol is used, and tert-butanol (TBA) when water is used. After they have been removed, these derivatives can be cleaved to isobutene in a reversal of their formation.

The cleavage of methyl tert-butyl ether (MTBE), for example, to the isobutene and methanol can be performed in the presence of acidic or basic catalysts in the liquid phase or gas/liquid mixed phase or in the pure gas phase. MTBE cleavage in the gas phase has the advantage that it generally proceeds at higher temperatures. The equilibrium of the endothermic reaction of MTBE to give isobutene and methanol is thus more strongly to the side of the products, and so higher conversions can be achieved.

At high conversions and high temperatures, however, by-product formation is enhanced. For example, the isobutene formed in the cleavage of MTBE forms undesired $C_8$ and $C_{12+}$ components as a result of acid-catalysed dimerization or oligomerization. The undesired $C_8$ components are principally 2,4,4-trimethyl-1-pentene and 2,4,4-trimethyl-2-pentene. In addition, a portion of the methanol which forms in the cleavage is converted to dimethyl ether with elimination of water.

In the case of processes for cleavage of tert-alkyl ethers, there is therefore a requirement for catalysts which catalyse the cleavage of the tertiary alkyl ethers to isoolefin and alcohol with very high selectivity, but do not promote any side reactions, for example C-C cleavage or dehydrogenation, and C-C coupling reactions or ether formation from the alcohols formed. Furthermore, these catalysts should enable high space-time yields (STY) and have a high service life.

CN 1 853 772 describes the selectivity-enhancing action of a steam treatment in the preparation of aluminosilicate catalysts for the cleavage of methyl tert-butyl ether. However, catalysts thus pretreated are also deactivated under reaction conditions. A steam treatment for regeneration of the catalyst is not described in CN 1 853 772.

EP 1 894 621 A1 describes a gas phase process for preparation of isoolefins with an alkali metal and/or alkaline earth metal-doped aluminosilicate as a catalyst, the preparation of which is described in the same patent application. The catalyst described in EP 1 894 621 achieves, at a conversion of 85%, high isobutene selectivities of >99% and likewise high methanol selectivities of approx. 97%. With increasing experiment time, however, the conversion declines under otherwise constant experimental conditions (temperature, pressure, residence time, amount of catalyst, feed composition). For example, the conversion after 2500 h is still only 72% under otherwise identical conditions.

It has now been found using this catalyst system that a high conversion of, for example, 85% can be ensured by continuously raising the temperature. As a result, the mass of the secondary components rises and the selectivity for the main components falls. More particularly, the formation of dimethyl ether rises significantly.

Attempts to regenerate the catalyst at elevated temperatures under a nitrogen atmosphere have shown that a recalcination of the catalyst at temperatures greater than 400° C. allows the original activity to be reestablished. On the industrial scale, however, a treatment of the catalyst at temperatures greater than 400° C. is usually not possible in industrial scale reactors for ether cleavage since they are not designed in terms of integrity for temperatures greater than 400° C. owing to the reaction temperatures which lie below this range, and a design for higher temperatures would not be economic. Therefore, a deinstallation from the reactor is required for the regeneration of the catalysts. This in turn leads to a prolonged stoppage and hence production shutdown. In addition, the refilling of a reactor with a heterogeneous catalyst is a comparatively complex process.

An in situ regeneration not requiring the deinstallation of the catalyst would result in a shorter stoppage and would make a complex refilling of the reactor superfluous.

It was therefore an object of the invention to develop a process for regenerating aluminosilicate-based catalysts for the cleavage of tert-alkyl ethers, which can be performed without deinstallation from the reactor, i.e. in situ, and ensures the reestablishment of the necessary selectivities with regard to isobutene and methanol formation.

This object is achieved by a process for regenerating catalysts containing mixed oxides from the group of alkali metal and/or alkaline earth metal oxides, aluminium oxide and silicon oxide, characterized in that the regeneration comprises the following features:
  i) treatment of the catalyst in situ,
  ii) contacting of the catalyst with water,
  iii) treatment of the catalyst within a temperature range from 100 to 400° C.,
  iv) treatment of the catalyst within a pressure range from 0.1 to 2 MPa,
  v) treatment of the catalyst over a period of 0.1 to 24 h,
  vi) treatment of the catalyst with a specific catalyst hourly space velocity of 0.1 to 100 $h^{-1}$.

The treatment of the catalysts for cleavage of tert-alkyl ethers, the main constituents of which in a formal sense are aluminium oxide and silicon oxide, with steam is found to be advantageous within a temperature range from 150 to 380° C., more preferably from 200 to 350° C. Deinstallation of the catalyst from the reactor is not necessary.

The duration of the steam treatment is preferably 1 to 10 h, more preferably 2 to 6 h. The pressure range is preferably from 2 to 10 bar. The specific catalyst hourly space velocity (WHSV; grams of water at room temperature per gram of catalyst per hour) is preferably within a range from 0.5 to 30 $h^{-1}$.

EXAMPLE

Gas Phase Cleavage of MTBE to Isobutene and Methanol, and Subsequent Regeneration of the Catalyst The cleavage was carried out in a fixed bed reactor with a heating jacket, through which a heat carrier oil (Marlotherm S H from Sasol Olefins & Surfactants GmbH) flowed. The catalyst used was the catalyst described in EP 1 894 621. The reactant used was MTBE of technical-grade quality (DRIVERON® from Evonik Oxeno GmbH) with a purity of 99.7% by mass.

After in situ regeneration with steam, a catalyst operated for 4000 h under operating conditions (at MTBE conversion approx. 85%) exhibits an increased conversion and simultaneously increased selectivities for the main isoolefin and alcohol or water products with otherwise unchanged operating parameters (temperature, pressure, residence time, amount of catalyst, feed composition).

Before entry into the reactor, the MTBE was evaporated completely in an evaporator at 240-270° C. At a temperature of 240-270° C. (temperature of the Marlotherm in the feed of the reactor jacket) and a pressure of 0.7 $MPa_{absolute}$, 1500 g/h of MTBE were passed through 300 g of catalyst, corresponding to a WHSV of 5 $h^{-1}$. The gaseous product mixture was analysed by gas chromatography. To compensate for the progressive catalyst deactivation, the temperature was increased continuously, such that a conversion of 85% was always achieved.

The cleavage was performed under the above conditions over a period of approx. 6000 hours.

After 4500 h, regeneration was performed with steam according to the invention, by first shutting down the MTBE feed stream and then using steam as the feed at 270° C. and 0.7 MPa with a WHSV of 1 $h^{-1}$ for 3 h.

The conversion of reactant and product mixture was used to calculate the isobutene conversions, the selectivities of isobutene formation (number of moles of isobutene formed relative to number of moles of MTBE converted) and the selectivities of methanol formation (number of moles of methanol formed relative to number of moles of MTBE converted) at different reaction times. These values were compiled in Table 1 below.

TABLE 1 conversions, selectivities and temperatures of the cleavage of MTBE according to example

| Experiment time/h | 52 | 500 | 2000 | 4000 | 4500 | 4550 | 6000 |
|---|---|---|---|---|---|---|---|
| Temperature/° C. | 240 | 250 | 260 | 270 | 270 | 255 | 265 |
| MTBE conversion/% | 85 | 85 | 85 | 85 | 99 | 85 | 85 |
| Isobutene selectivity/% | >99 | >99 | >99 | >99 | >99 | >99 | >99 |
| Methanol selectivity/% | 97 | 96 | 94 | 94 | 95 | 96 | 95 |

As is evident from Table 1, the catalyst becomes deactivated with increasing operating time. The continuous temperature increase to compensate for the progressive catalyst deactivation simultaneously causes a decline in the methanol selectivity from initially approx. 97% to a value of 94% at 4000 h. After the regeneration with steam at approx. 4500 h, the catalyst exhibits a significantly higher activity at the same temperature, and the conversion rises to approx. 99%, while the methanol selectivity likewise even increases slightly to 95%. Once the temperature has been regulated such that a conversion of 85% is again established, a significantly increased methanol selectivity can be observed compared to the state before the steam regeneration. The catalyst is also deactivated after the steam treatment, but still exhibits stable selectivities, as the measurements at 6000 h show.

The invention claimed is:

1. A process comprising:
   gas phase cleaving methyl tert-butyl ether to isobutene and methanol over a catalyst installed in a reactor, and
   subsequently regenerating the catalyst in situ by contacting the catalyst with steam within a temperature range from 100 to 400° C. and a pressure range from 0.1 to 2 MPa, over a period of 0.1 to 24 h, with a specific catalyst hourly space velocity of 0.1 to 100 $h^{-1}$,
   wherein the methyl tert-butyl ether is evaporated before entry into the reactor as a feedstream,
   wherein the feedstream of methyl tert-butyl ether is shutdown before the regeneration of the catalyst, and
   wherein the catalyst comprises:
   at least one of an alkali metal oxide and an alkaline earth metal oxide, and
   at least one of aluminum oxide and silicon oxide.

2. The process of claim 1, wherein the temperature range of the regeneration with steam is from 150 to 380° C.

3. The process of claim 1, wherein the temperature range of the regeneration with steam is from 200 to 350° C.

4. The process of claim 1, wherein the pressure range of the regeneration with steam is from 0.2 to 1 MPa.

5. The process of claim 1, wherein the treatment time is from 1 to 10 h.

6. The process of claim 1, wherein the treatment time is from 2 to 6 h.

7. The process of claim 1, wherein the specific catalyst hourly space velocity is from 0.5 to 30 $h^{-1}$.

8. The process of claim 2, wherein the pressure range is from 0.2 to 1 MPa.

9. The process of claim 3, wherein the pressure range is from 0.2 to 1 MPa.

10. The process of claim 2, wherein the regeneration period is from 1 to 10 h.

11. The process of claim 3, wherein the regeneration period is from 1 to 10 h.

12. The process of claim 2, wherein the regeneration period is from 2 to 6 h.

13. The process of claim 3, wherein the regeneration period is from 2 to 6 h.

14. The process of claim 4, wherein the regeneration period is from 2 to 6 h.

15. The process of claim 2, wherein the specific catalyst hourly space velocity is from 0.5 to 30 $h^{-1}$.

16. The process of claim 3, wherein the specific catalyst hourly space velocity is from 0.5 to 30 $h^{-1}$.

17. The process of claim 4, wherein the specific catalyst hourly space velocity is from 0.5 to 30 $h^{-1}$.

18. The process of claim 4, wherein the specific catalyst hourly space velocity is from 1 to 10 h.

19. The process of claim 5, wherein the specific catalyst hourly space velocity is from 0.5 to 30 h$^{-1}$.

20. The process of claim 6, wherein the specific catalyst hourly space velocity is from 0.5 to 30h$^{-1}$.

\* \* \* \* \*